United States Patent
Ohde

(10) Patent No.: US 6,793,312 B2
(45) Date of Patent: Sep. 21, 2004

(54) INK JET RECORDING APPARATUS AND METHOD FOR CONTROLLING INK JET RECORDING APPARATUS

(75) Inventor: Takahiro Ohde, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/291,780

(22) Filed: Nov. 12, 2002

(65) Prior Publication Data

US 2003/0095161 A1 May 22, 2003

(30) Foreign Application Priority Data

Nov. 20, 2001 (JP) ........................................ 2001-354691
Nov. 22, 2001 (JP) ........................................ 2001-357714

(51) Int. Cl.[7] ........................ B41J 29/393; B41J 29/38; B41J 25/308
(52) U.S. Cl. ........................ 347/19; 347/12; 347/10; 347/15; 347/8; 347/9
(58) Field of Search ................................ 347/19, 15, 14, 347/12, 10, 8, 9, 11, 5; 399/24, 29

(56) References Cited

U.S. PATENT DOCUMENTS 5,802,420 A * 9/1998 Garr et al. .................... 399/27
5,984,454 A * 11/1999 Takahashi et al. ............ 347/43

* cited by examiner

Primary Examiner—Stephen D. Meier
Assistant Examiner—Charles Stewart, Jr.
(74) Attorney, Agent, or Firm—Fitzpatrick, Cella, Harper & Scinto

(57) ABSTRACT

An ink jet recording apparatus includes plural print buffers for storing recording data, a null flag table capable of setting null flags corresponding to the print buffers instead of storing null data on the print buffers, data converting means provided with plural writable blocks for writing the recording data and with a counter for retaining values to designate the writable blocks, clear means for zero clearing the writable blocks in accordance with the values of the counter, DMA means for reading out the recording data from the print buffers for writing the recording data on the writable blocks, and control means for enabling the clear means to zero clear the writable blocks when the null flags are set on the null flag table corresponding to the print buffers, instead of performing a process by the DMA means to read out data from the print buffers.

17 Claims, 10 Drawing Sheets

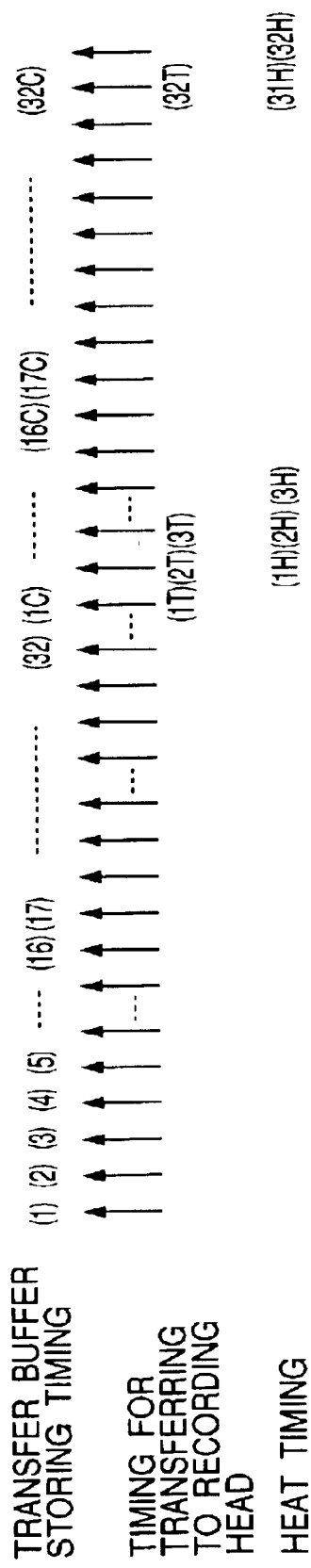

INK JET RECORDING APPARATUS AND METHOD FOR CONTROLLING INK JET RECORDING APPARATUS

BACKGROUND OF THE INVENTION

1. Field of the Invention

The present invention relates to an ink jet recording apparatus and a method for controlling the ink jet recording apparatus.

2. Related Background Art

The serial type printer represented by the ink jet recording apparatus (printer) performs printing with the recording head that scans in the direction orthogonal to the conveying direction of a recording medium, and conveys the recording medium in a portion corresponding to the width of the recording head when one-time scanning is completed. A recording is executed by the repetition of such printing operation and conveyance of the recording medium. Inside the printer, then, the recording data, which have been transmitted from a host, are developed (stored) on a print buffer, and the data thus developed are converted so as to match them with the nozzle array of the recording head. The data that correspond to the nozzle length of the recording head are transferred one after another, thus discharging ink from the nozzles of the recording head that moves for the formation of images.

At this juncture, the "null skip control" is executed for the purpose of improving the speed of process and reducing the volume of print buffer storage. This is an operation such that when the recording data in the scanning direction of the recording head are zero (null) and in the zero status (null condition), which is made to continue for a specific unit in the conveying direction of a recording medium, the data are not developed (written) on the print buffer. Instead, null flags are set corresponding to the zero data.

(i) in FIG. 3 is a view that shows the state of the recording data stored on the print buffer without using the null skip control. Here, (i) in FIG. 3, the direction X is the scanning direction of the recording head, and the direction Y is the conveying direction of a recording medium. In the areas (5), (6), (11), and (12) of (i) in FIG. 3, all the recording data are null in the scanning direction of the recording head described earlier, and the null status continues for a specific unit (an eight-nozzle portion, for instance) in the conveying direction of the recording medium. In a case where the null skip control is not executed like this, null data are stored on the print buffer corresponding to such areas.

(iii) in FIG. 3 is a view that shows the storing state of the recording data on the print buffer as in the case illustrated at (i) in FIG. 3, but by use of the null skip control.

There is provided a null flag table that indicates whether or not the null data occupy each area per a specific unit in the conveying direction of the recording medium. The null skip control is executed with reference to information on this null flag table. The null flags corresponding to the areas (5), (6), (11), and (12) described earlier are set (the value thereof is set at 1), thus saving the development of null data on the print buffer. Then, as the reading process of the print buffer where the null flags are set, each dummy reading is performed on the next address of the print buffer where the null flag is set. Then, the null data is transferred to the recording head instead of the data thus read.

Also, when recording data are written (being written) into the print buffer or read out (being read out) from the print buffer, DMA means is used. Here, for a printer, a plurality of DMA means (DMA channels) is provided. When this means is used, the DMA bus is occupied in accordance with the order of priority. There are known such methods as the one that uses it in accordance with the predetermined order (priority order method) and the one that monitors the DMA channel one after another (cyclic method).

Besides the writing process and reading process of the print buffer described above, DMA means uses the DMA functions with respect to the request from the CPU for bus occupation, the recording data processing, the refreshing operation of a DRAM, the motor control, and the communications with the host, among some others.

As a result, while DMA means occupies the DMA bus for the execution of writing or reading process for the print buffer, the execution of other DMA processes (requests for the DMA) is required to wait eventually until the DMA bus is released.

For the execution of this null skip control, it has been practiced for DMA means to perform reading process of the reading data on the print buffer under any circumstances, irrespective of the presence or absence of null data on the print buffer having the null flag set thereon. In this case, if the null flag is set, the data thus read out is transferred to the recording head after having been converted into null data.

Also, when the null skip control is executed, it has been practiced for DMA means to perform reading process of the recoding data on the print buffer under any circumstances, irrespective of the presence or absence of null data on the print buffer having the null flag set thereon. In this case, if the null flag is set, the data thus read out is transferred to the recording head after having been converted into null data.

As a result, the occupation rate of the DMA bus increases, and there is encountered a problem that it takes a time to execute the process of DMA transfer, because the bus is not released despite the DMA request has been issued.

SUMMARY OF THE INVENTION

The present invention is designed with a view to solving the problems discussed above. It is an object of the invention to provide an ink jet recording apparatus and a method for controlling such ink jet recording apparatus serving the purpose.

In order to achieve the aforesaid object, the ink jet recording apparatus of the present invention, which is provided with plural print buffers for storing recording data, and a null flag table capable of setting a null flag corresponding to the print buffers instead of storing null data on the print buffers, comprises data converting means for converting specific data, being provided with plural writable blocks for writing the recording data, and a counter for retaining a value to designate the writable blocks; clear means for zero clearing the writable blocks in accordance with the values of the counter; DMA means for reading out the recording data from the print buffers for writing the recording data on the writable blocks; and control means for enabling the clear means to zero clear the writable blocks when the null flag is set on the null flag table corresponding to the print buffers, instead of the performance of process by the DMA means to read out data from the print buffers.

A method of the present invention for controlling an ink jet recording apparatus, which is provided with plural print buffers for storing recording data, a null flag table capable of setting a null flag corresponding to the print buffers, and data converting means for performing specific conversion of the recording data written on a writable block, comprises the steps of reading out the recording data from the print buffers by DMA means; zero clearing the writable block by clear means; and executing the clearing step instead of executing the reading out step corresponding to the null flag when the null flag is set on the null flag table corresponding to the print buffers.

Also, the ink jet recording apparatus of the present invention, which is provided with plural print buffers for retaining recording data for recording by enabling a recording head to scan on a recording medium, and a null flag table capable of setting null flags corresponding to specific number of data instead of storing null data on the print buffers, comprises DMA means for reading out the recording data from specific number of print buffers per scan; null flag examination means for examining the null flags corresponding to each of the specific number of print buffers; and control means for enabling the null flag examination means to examine the null flags per scan for the suspension of reading of the DMA means when all the null flags are found to be set as the result of the examination.

Also, the method of the present invention for controlling an ink jet recording apparatus, which is provided with plural print buffers for retaining recording data for recording by enabling a recording head to scan on a recording medium, and a null flag table capable of setting null flags corresponding to specific number of data instead of storing null data on the print buffers, comprises the steps of reading out the recording data from specific number of print buffers per scan by DMA means; examining null flags on the null flag table corresponding to each of the specific number of print buffers; and suspending the reading when the null flags are all set.

Figure 3:
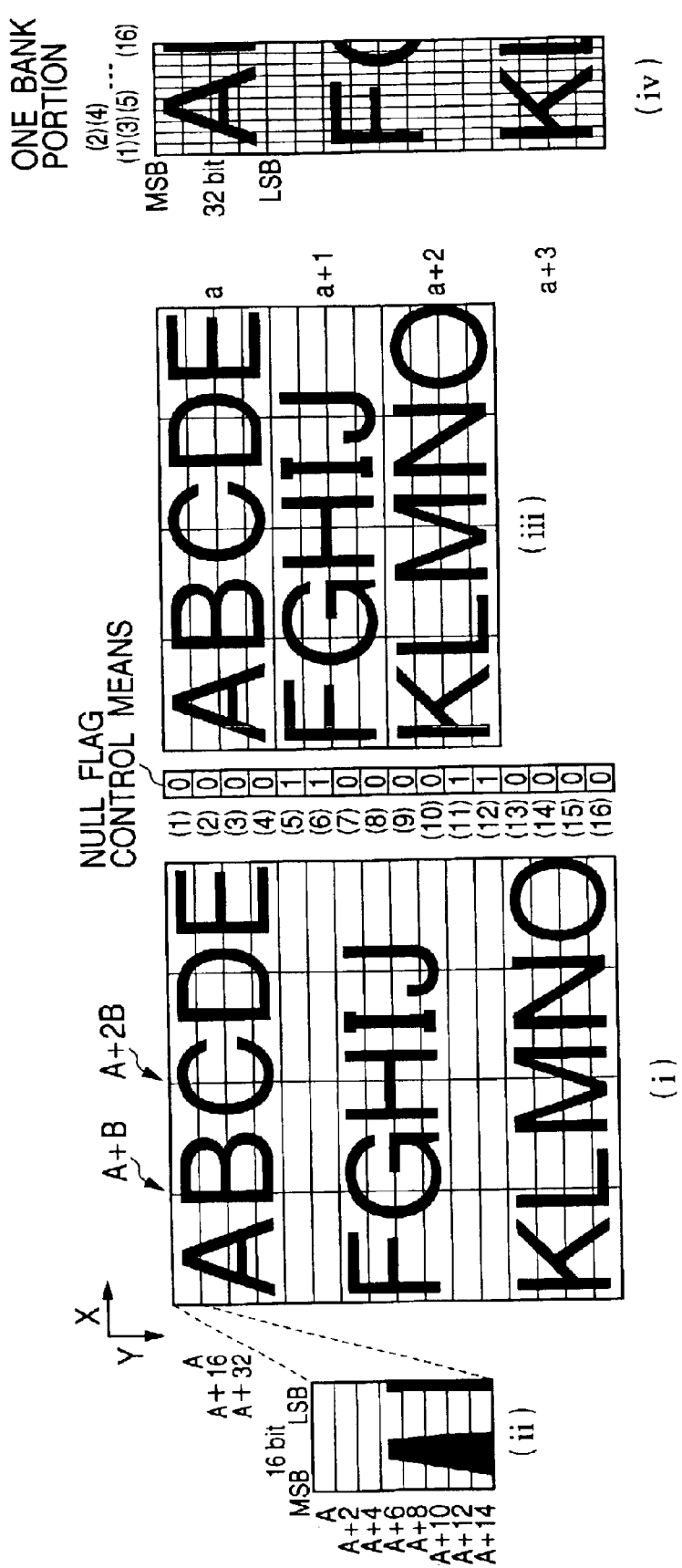

(i), (ii), (iii) and (iv) in FIG. 3 are views that illustrate the storing status of recording data on the print buffer and transfer buffer.

Figure 4A:
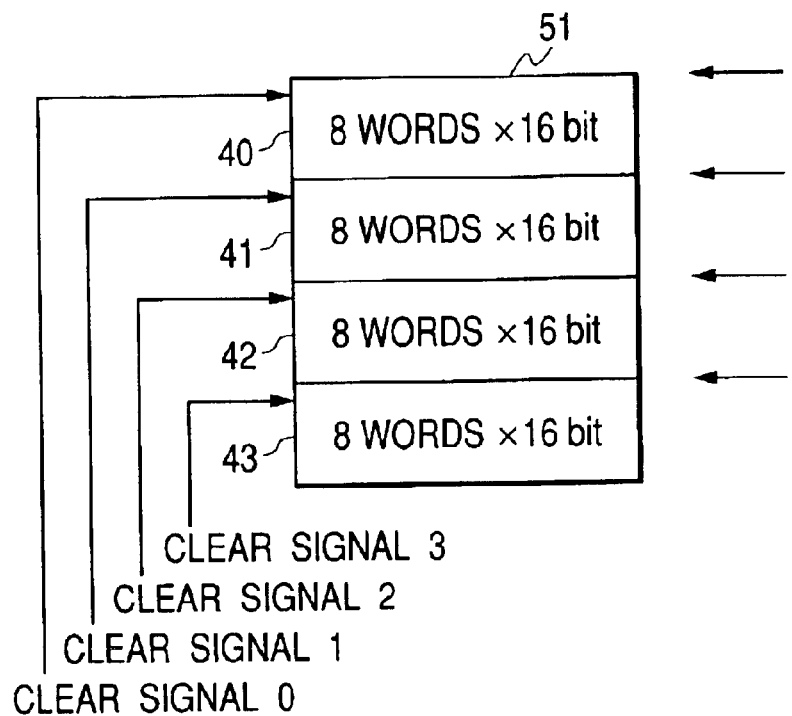
Figure 4B:
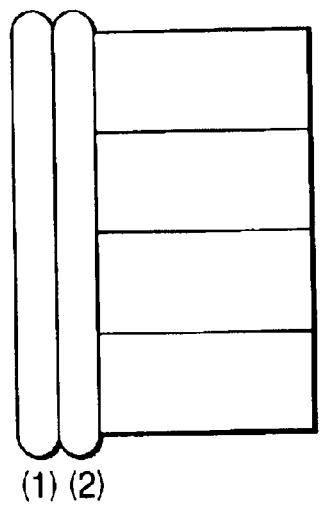

FIGS. 4A and 4B are views that schematically illustrate HV converting means.

FIG. 5 is a view that illustrates the recording timing (=heat timing) and the storing timing of recording data on the transfer buffer.

Figure 6:
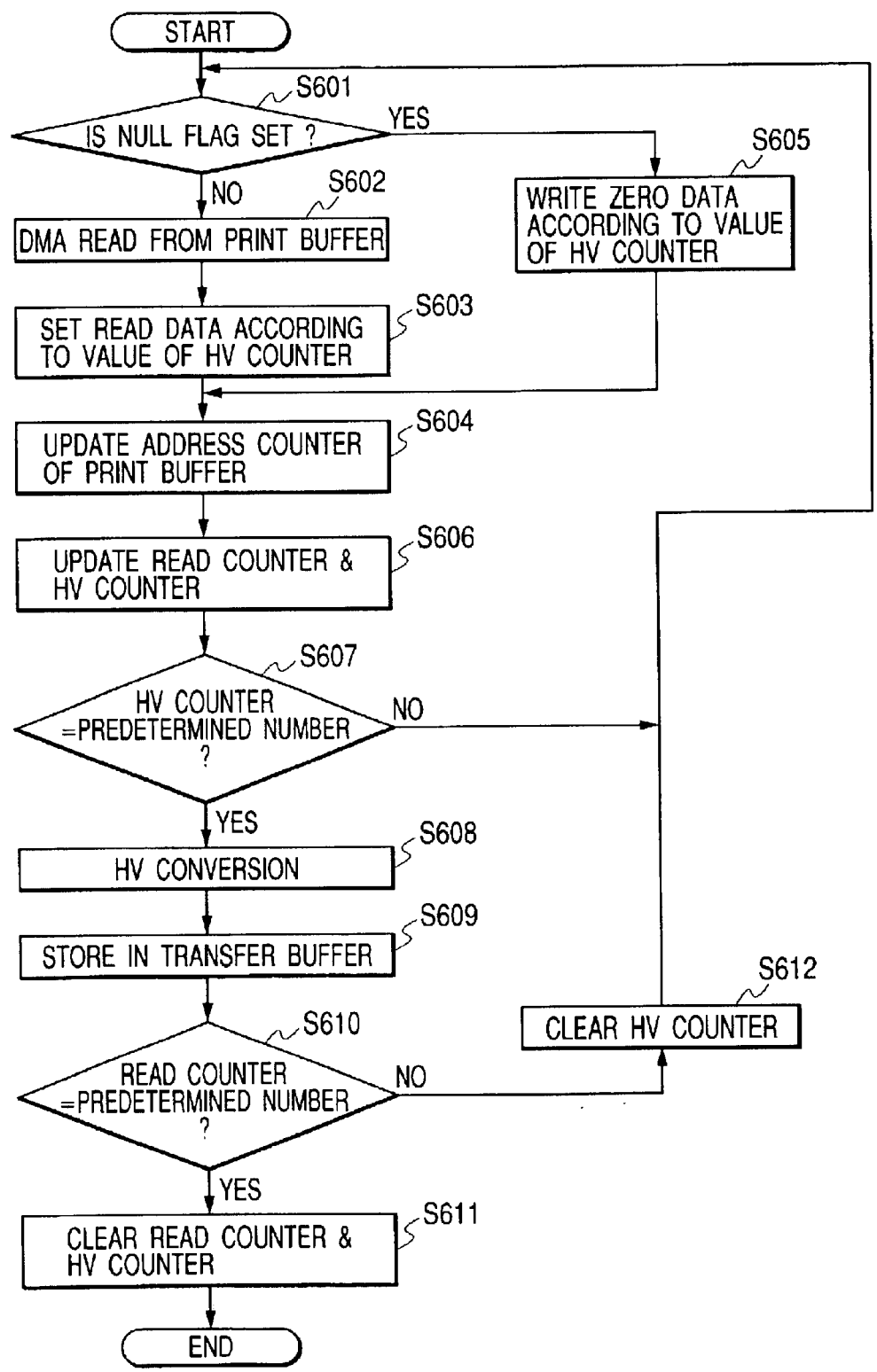

FIG. 6 is the flowchart that shows the control of a first embodiment.

Figure 7:
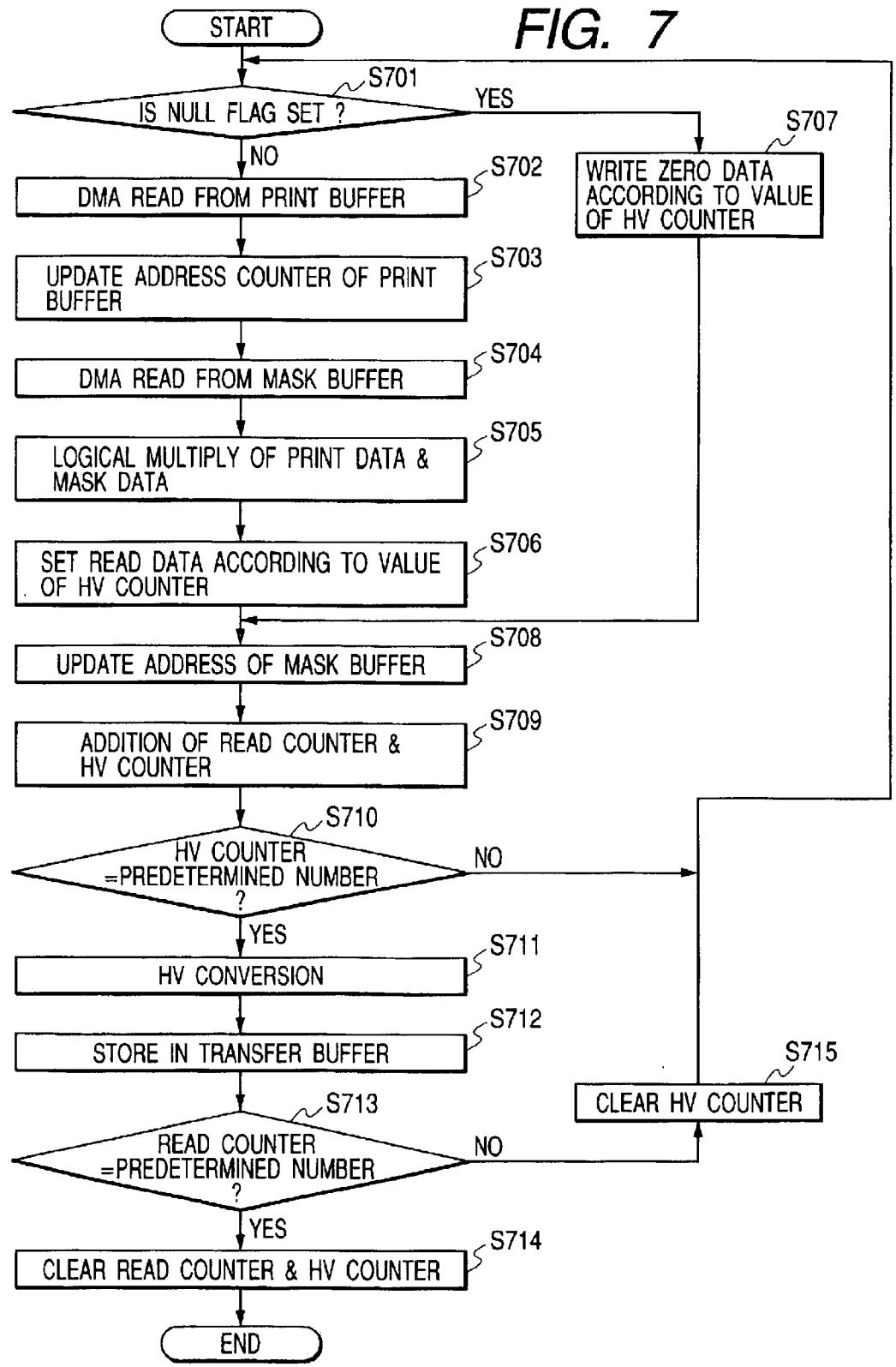

FIG. 7 is the flowchart that shows the control of a second embodiment.

Figure 8:
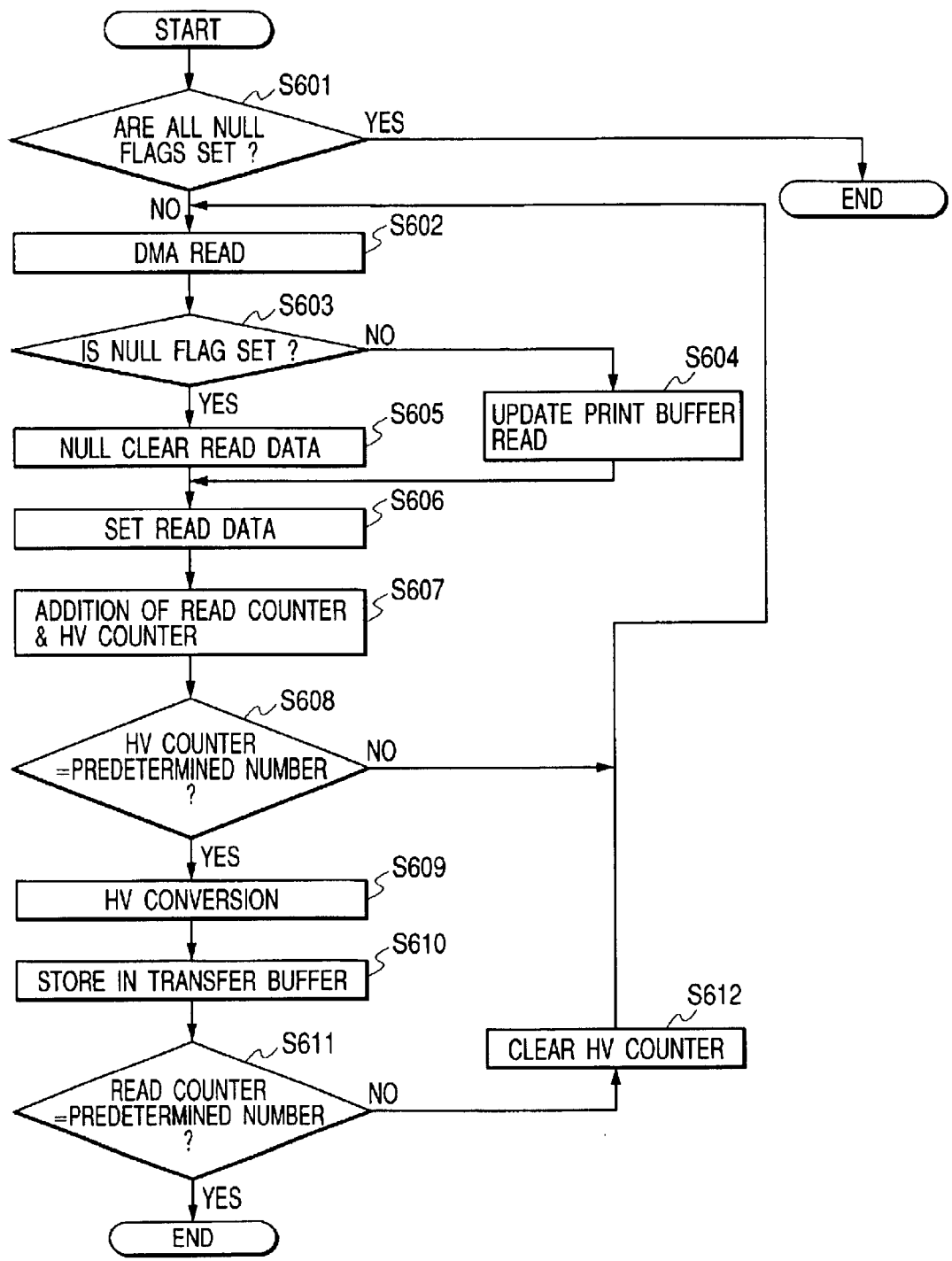

FIG. 8 is the flowchart that shows the control of a third embodiment.

Figure 9:
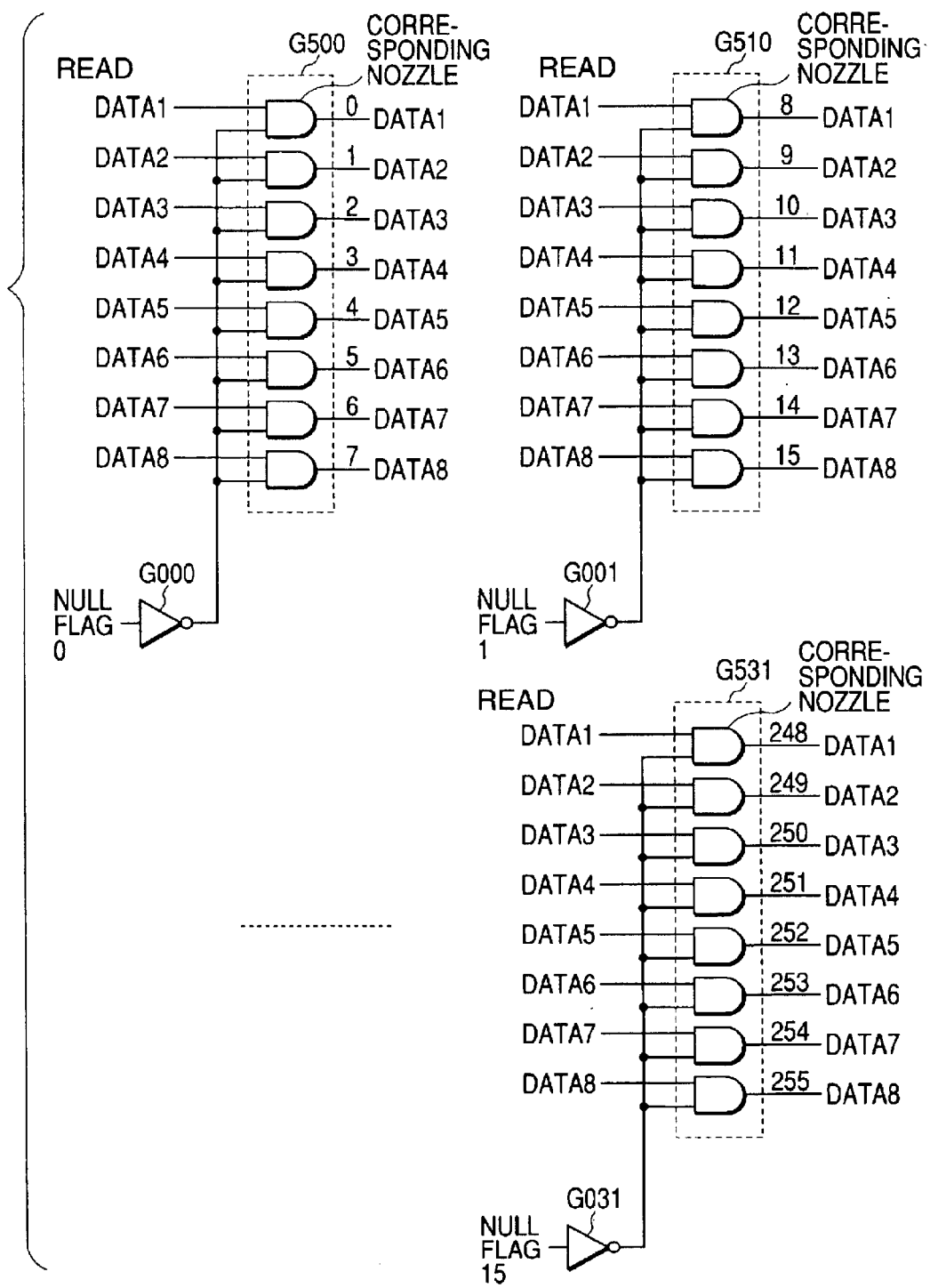

FIG. 9 is a view that shows one example of the structure implemented by hardware, which effectuates clearing in accordance with the values of null data flags.

Figure 10:
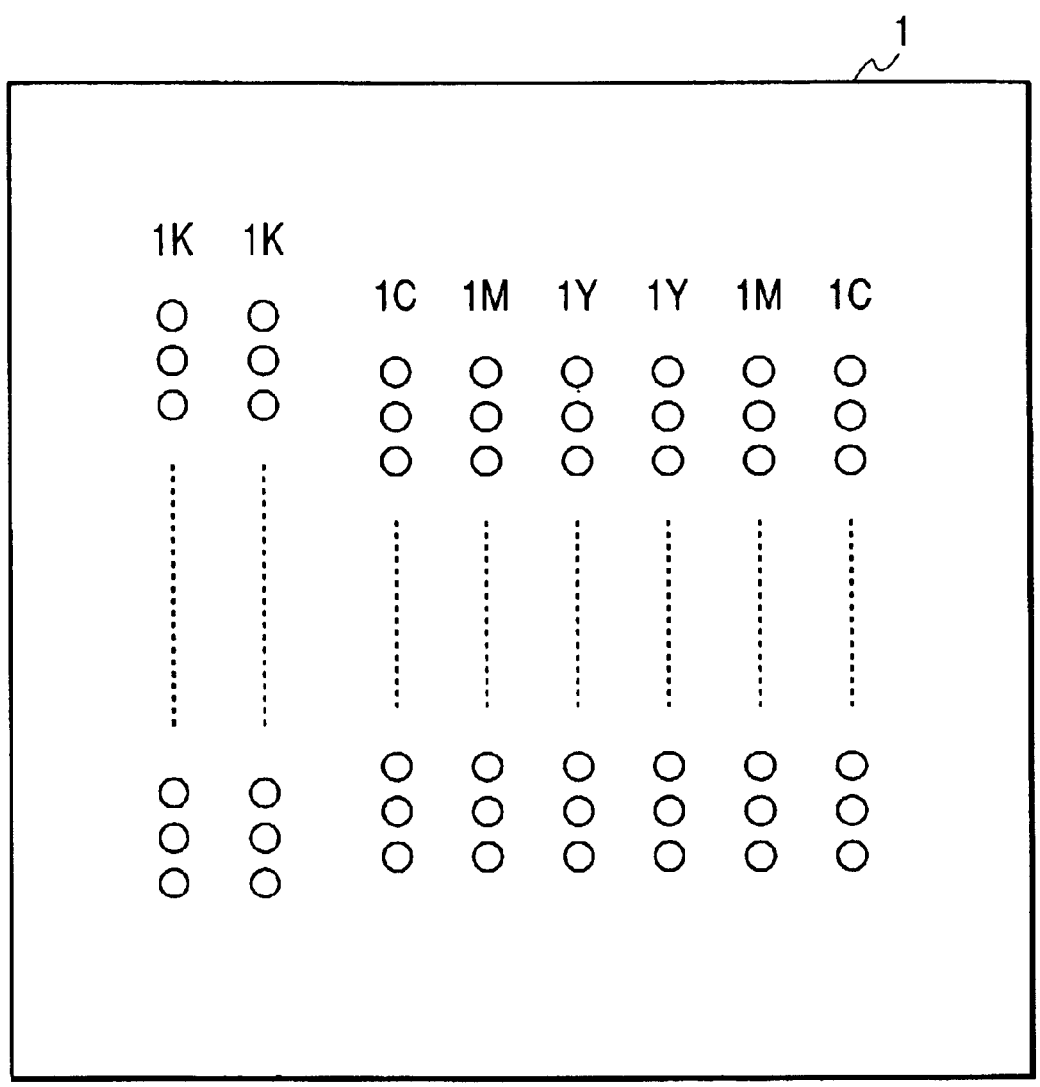

FIG. 10 is a view that shows the nozzle arrangement of a recording head.

DETAILED DESCRIPTION OF THE PREFERRED EMBODIMENTS

Figure 1:
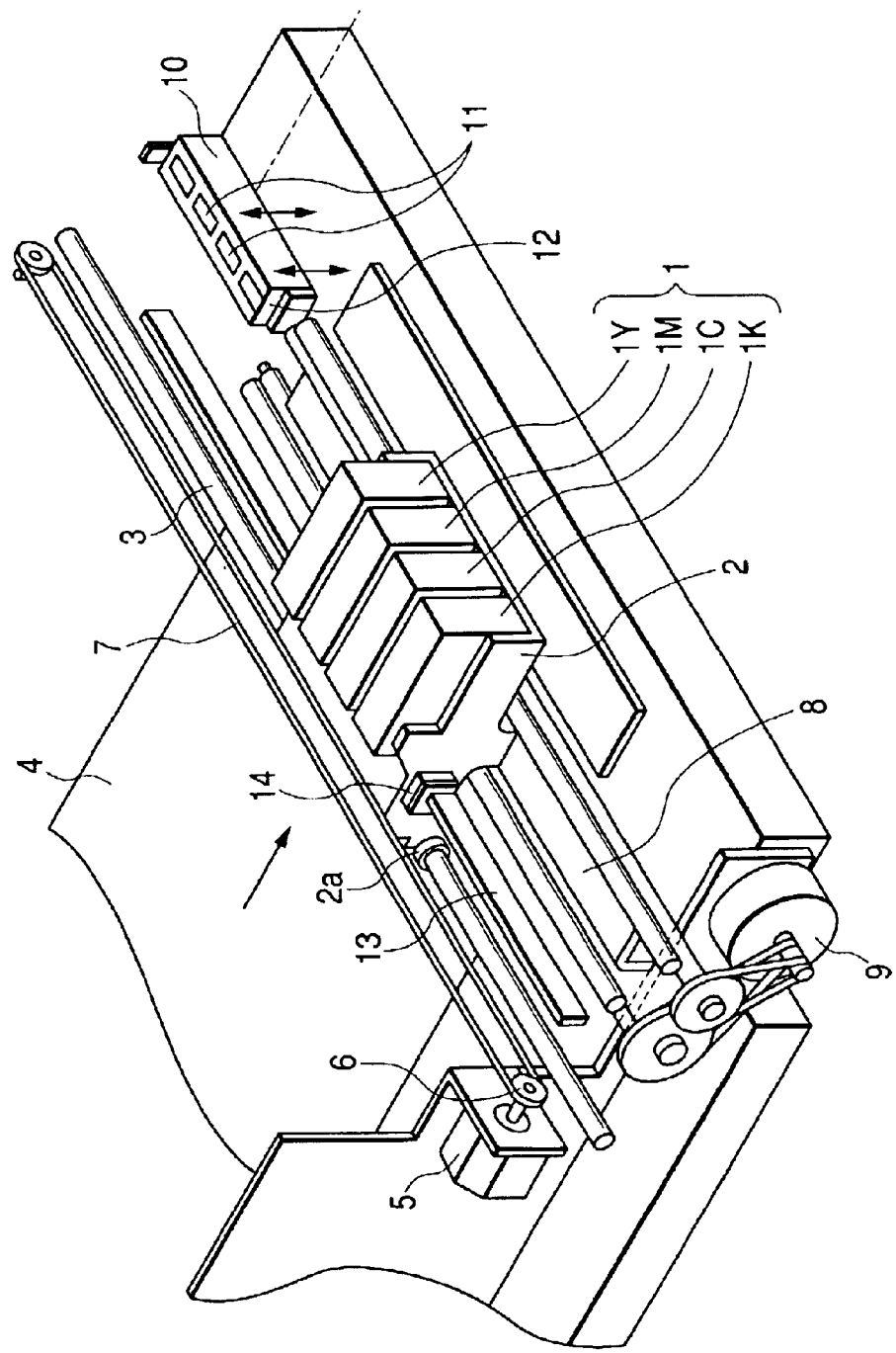
FIG. 1 is a view that shows the structure of an ink jet recording apparatus.

FIG. 1 is a view that shows the structure of an ink jet recording apparatus, which is applicable to embodying the present invention. This recording apparatus is an ink jet recording apparatus (printer) having a recording head 1 of ink jet recording type.

The recording head 1 is mounted on a carriage 2 in such a posture that it can discharge ink downward in FIG. 1. Ink droplets are discharged, while the bearing portion 2a of the carriage 2 moves along a guide shaft 3, thus forming an image of one-scanning portion on a recording medium 4, such as a recording sheet.

In this respect, the reciprocation of the carriage 2 along the guide shaft 3 is effectuated by the rotation of a pulley 6 to which the driving power of a carriage motor 5 is transmitted through a timing belt 7.

When the recording head 1 completes recording of one-scanning portion, a carrier motor 9 is driven to convey the recording medium 4, which is positioned on a platen 8, in a specific amount in the direction orthogonal to the traveling direction of the carriage 2. Then, the image formation of the next one-scanning portion is made, while the carriage 2 moves again along the guide shaft 3. These operations are repeated to complete the formation of images on the recording medium 4.

On the right side of the printer, there is arranged a recovery unit 10 for keeping ink discharges from the recording head 1 in good condition. The recovery unit 10 is provided with a cap 11 for capping the recording head 1; a wiper 12 for wiping the discharge surface of the recording head 1; and a suction pump (not shown) for sucking ink from the ink discharge nozzles of the recording head 1, among some others.

Also, this printer is provided with an encoder scale 13 and an encoder 14. The structure is then arranged so that the traveling speed of the carriage 2 is detected, and that the feedback control thereof is carried out when the carriage motor 5 is driven. Also, the encoder 14 reads the positional information of the encoder scale 13 in order to take the ink discharge timing (hereinafter referred to as heat timing) of the recording head 1.

For this recording head 1, plural recording elements are arranged with ink jet recording method. The recording element is formed by a driving portion and nozzle. Then, the driving portion is made possible to give ink heat by means of electrothermal converting element (discharge heater). With such heat, ink generates film boiling, and by the pressure changes exerted by the growth and shrinkage of bubble created by such film boiling, ink is discharged from the nozzle.

As shown in FIG. 10, the recording head 1 has a total of four color heads, that is, the cyan recording head 1C (nozzle array); the magenta recording head 1M (nozzle array); the yellow recording head 1Y (nozzle array); and the black recording head 1K (nozzle array).

The recording heads of each color, 1C, 1M, 1Y, and 1K, are arranged in parallel, and mounted on the carriage 2 so that each of them is arranged in the traveling direction of the carriage 2. The number of nozzles for black recording dots is 320, and 160 nozzles form one line. There are two nozzle lines. Likewise, the cyan, magenta, and yellow recording heads are provided with a total of 256 nozzles each, and 128 nozzles form one line each. The nozzle arrays are arranged for cyan, magenta, yellow, yellow, magenta, and cyan in that order, thus making it possible to perform bi-directional recording. These nozzles are arranged in the conveying direction of a recording medium. In this respect, the resolution of the black recording head is 300 DPI, and the resolution of cyan, magenta, and yellow recording heads is 600 DPI, respectively.

Figure 2:
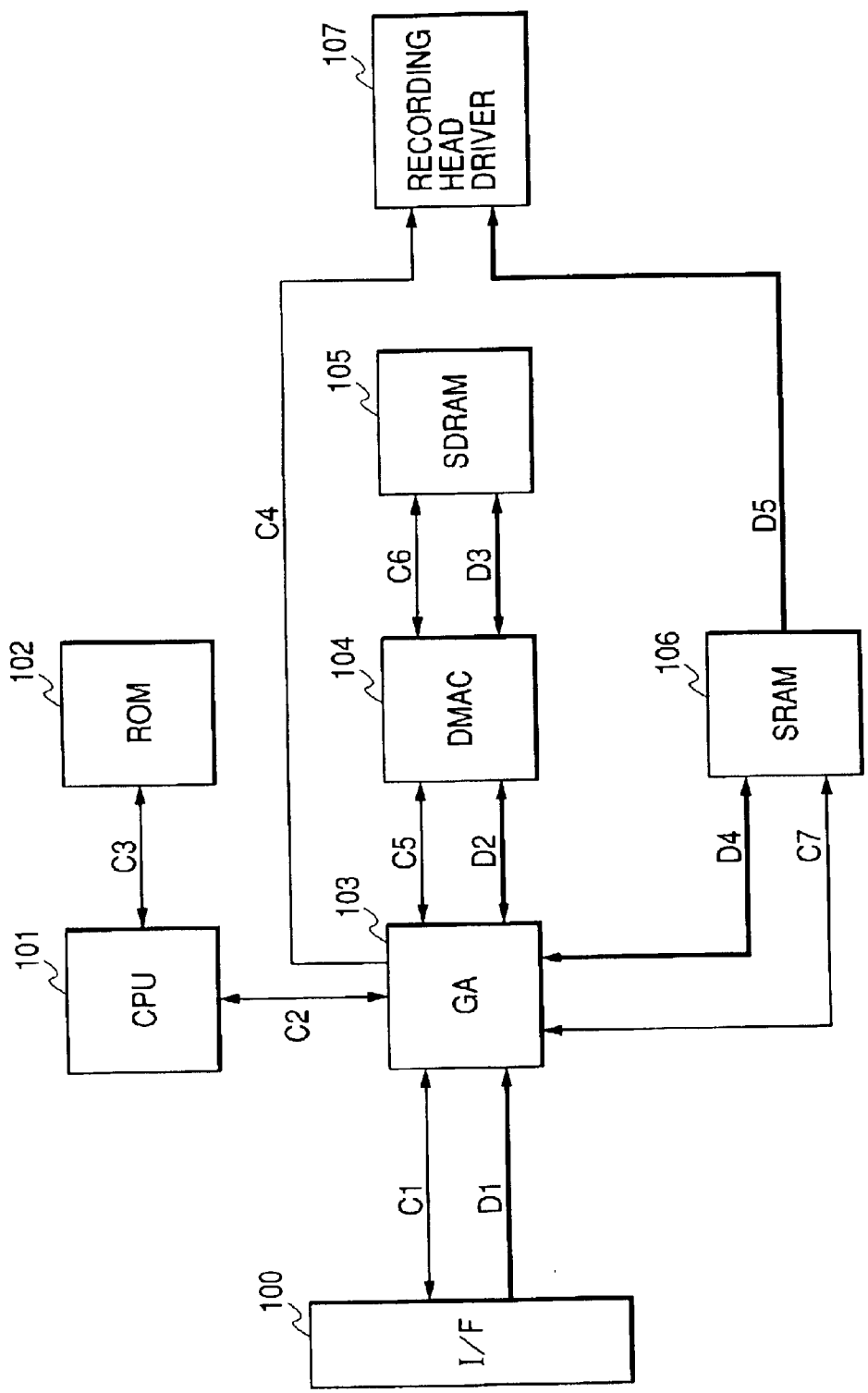
FIG. 2 is a view that shows the control structure of the ink jet recording apparatus.

FIG. 2 is a view that shows the control structure of the printer. In FIG. 2, reference marks C1 to C7 designate control signals, and D1 to D5, the flow of recording data. A reference numeral 100 designates the I/F block that receives recording data from the host, which is formed by FIFO memory. Recording data are provisionally stored when received, and the GA 103 analyzes the control codes from among the data thus provisionally stored. Then, with DMA means, only image data among the data thus analyzed are developed on the print buffer provided for RAM 105. This process is executed for the data corresponding to each color.

A reference numeral 101 designates the CPU that executes various control of recording operation and others; 102, the ROM that stores programs, such as procedure of recording operation; and 103, the GA that controls the entire systems under the control of the CPU 101. Here, the aforesaid data analysis, the reading of recording data from the print buffer, the data transfer to the recording head 1, and others are executed. The HV converting means, which will be described later, is also provided with the GA 103, and executes the process to convert the format of recording data so as to enable them to match with the nozzle array of the recording head.

A reference numeral 104 designates the DMAC (DMA control) that controls plural DMA channels used by the printer. When DMA requests are overlapped, for example, coordination takes place in accordance with priority order, and DMA requests are processed in that order.

A reference numeral 105 designates the RAM that stores data provisionally, which is provided with the print buffer and mask buffer. For the mask buffer, there is arranged mask data for thinning recording data. The mask data is used in the recording mode for the completion of recording image by plural scans.

In this respect, for the RAM of the present embodiment, SDRAM is used to make it possible to read (read out) data of eight words from a consecutive address by one-time DMA reading operation (reading out by means of DMA), that is, the function of "burst reading" is made available.

A reference numeral 106 designates the SRAM that performs the DMA transfer from the print buffer in the SDRAM 105 to HV converting means of the GA 103, which is provided with the transfer buffer that stores data thus converted by the HV converting means. This transfer buffer is structured independently to correspond to all the nozzles of the recording head 1 one to one.

A reference numeral 107 designates the recording head driver that controls the recording head 1. In this respect, the driving timing thereof is provided in accordance with information of the aforesaid encoder 14, and controlled by the GA 103.

Next, in conjunction with in conjunction with FIG. 2 and (i), (ii), (iii) and (iv) in FIG. 3, the description will be made of the storing condition of data on the print buffer and transfer buffer, and the format of the recording data transferred to the recording head 1 from the input thereof into the I/F block 100.

The printing data that contain recording data received by the I/F 100 are developed by the DMA process on the print buffer in the SDRAM 105 through the GA 103. At this juncture, the data are stored in such a format as to provide consecutive addresses in the nozzle direction corresponding to each nozzle array of the recording head 1.

As a result, the recording data thus developed on the print buffer are arranged on the addresses as shown (ii) in FIG. 3. Then, when the DMA reading from the print buffer takes place, the data of eight-word portion is DMA read from the designated read initiation address A (at which reading begins) to A+2, A+4, A+6, A+8, A+10, A+12, and A+14 at high speed by means of the burst reading function of the SDRAM along with the automatic increment of each address in that order beginning with the address A.

Further, when reading the data in the nozzle direction of the recording head 1, the read initiation address is set at A+16, thus making the DMA reading possible for the data of eight-word portion at the consecutive addresses. Here, while updating the read initiation address of the print buffer for the entire nozzle number (128 nozzles, for instance) of each nozzle array of the recording head, the data are obtained by the repetition of the DMA reading.

Also, when the read initiation address is updated in the scanning direction of the carriage 2, the read initiation address is changed to A+B, and then, reading is made in the same manner. Here, the "B" is a predetermined offset value. Also, the designation of the read initiation address and the offset value is effectuated by providing a given set value to a specific register.

Then, if the data as shown (i) in FIG. 3 are present, the null skip control is used to store them on the print buffer as shown (iii) in FIG. 3. Also, the null flags are needed to cover the length of the recording head. Here, for example, as the null skip control is executed at eight-nozzle unit for the 128 nozzles, 16 flags are needed. Then, there is provided a null flat table for storing such flags. Also, owing to the address formation of the print buffer shown (iii) in FIG. 3, the data of one word portion are read (read out) in the scanning direction of the carriage 2 by the data of 16-dot portion per nozzle.

(iv) in FIG. 3 shows the format of recording data stored on the transfer buffer provided for the SRAM 106. Here, it is assumed that the SRAM 106 has a format of 32 bits. (iv) in FIG. 3, the data is converted into the format suitable for transferring the data developed on the print buffer as shown (iii) in FIG. 3 to the recording head 1. The data shown (iv) in FIG. 3 is converted on the bases of the recording data shown in (iii) in FIG. 3 and the null-flag data as well. As a result, it becomes possible to transfer the recording data to the recording head 1 efficiently by reading the transfer buffer at the specific heat timing.

FIGS. 4A and 4B are views that illustrate HV converting means. FIG. 4A illustrates the case where recording data is written on HV converting means. A raster data of 16 bits of eight-word unit is written (being written into this means). The block thus written is each writable blocks (writing-in blocks) 40, 41, 42, and 43. For the present embodiment, HV converting means is provide with four blocks.

FIG. 4B illustrates the case where data are read out from HV converting means. The HV conversion is such as to convert the raster data arranged in the scanning direction of the recording head into the column data arranged in the nozzle array direction of the recording head. The block provided for reading the column data is the readable block (reading-out block). The recording data stored at specific addresses of the print buffer shown (iii) in FIG. 3 are converted by means of the HV conversion into the recording data shown (iv) in FIG. 3. Here, the numerals in parentheses shown in FIG. 4B correspond to the numerals in parentheses of reading data shown in (iv) in FIG. 3.

This block is formed by an HV counter that counts 0 to 3; four writable blocks 40 to 43 that performs writing per eight words; a readable block that reads per 32 bits; select signals to select the readable block and writable block; and clear signals (clear signal 0 to clear signal 4) to effectuate zero clear for each data on the writable blocks. In FIG. 4B, a reference numeral 51 designates the HV conversion block.

Now, for example, if the HV counter indicates zero, it is possible to write data on the writable block 40, and if the HV counter indicates 1, it is possible to write data on the writable block 41.

The GA 103 is provided with a clear circuit (clear means) for zero clearing the specific writable block of HV converting means. This clear circuit selects the specific writable block in accordance with the value of the HV counter, and writes zero data on the writable block thus selected (carries out zero clear).

For example, if the HV counter indicates zero, the clear signal 0 is inputted into the writable block 40 so that the zero data is written to only the writable block 40. If the HV counter indicates 1, the clear signal 1 is inputted into the block 41 so that the zero data is written to only writable block 41.

Whenever the DMA reading from the print buffer (the DMA read-out) is carried out, data are written (being written) into the specific writable block in accordance with the value of the HV counter. Then, the HV counter is incremented (1 is added thereto).

When the value of the HV counter becomes 3, the data writing to the four writable blocks (the write-in operation) are complete. Thus, the data thus written are read out after the HV conversion, and stored on the transfer buffer.

The data of this 16-bit portion are stored on the transfer buffer, the HV counter is zero cleared, and the blocks are again prepared to be the writable ones. Then, the data, which have been DMA read out from the print buffer, are written thereon in accordance with the value of the HV counter.

Also, the data on the writable block into which the clear signal is inputted are all zero cleared. Such process is executed for the data corresponding to each recording head.

As a result, the data of 32 bits is stored on each address of the transfer buffer provided for the SRAM 106. Then, the recording data, which are given simultaneous heating by the nozzle array of the recording head, are easily transferred to the recording head 1 by reading the addresses, such as A, A+1, A+2.

FIG. 5 is a view that schematically shows the relations between the actual recording (=heat) timing and the timing of recording data storage on the transfer buffer. To simplify the illustration, representation is made only for data of one color portion.

FIG. 5 illustrates the timing of recording data storage on the transfer buffer provided for the SRAM 106; the transfer timing from the transfer buffer to the recording head; and the discharge timing of the recording head (heat timing).

In FIG. 5, time elapses from the left to the right, and the case shown therein is the one where ink is discharged from the recording head corresponding to the recording data of a 32-column portion per scan. Arrow marks in FIG. 5 indicate timing signal, and the frequency of the signal is equal to the driving frequency of the recording head. Therefore, if the driving signal of the recording head is 10 kHz, the timing frequency is also 10 kHz. The output number of the timing signal is that of 66 timing when a 32-column portion is recorded per scan, for example.

Numerals in parentheses above arrow marks indicate the timing of storage on the transfer buffer. Those in parentheses below arrow marks indicate the timing of transfer to the recording head and discharge (heat) timing, respectively. The timing delayed by 1 from the timing of transfer to the recording head is the heat timing. In this respect, the numerals in parentheses correspond to those in parentheses for the data shown (iv) in FIG. 3

As one example, the data corresponding to (1) is stored on the bank on one side of the transfer buffer by the timing indicated by an arrow mark on the leftmost side, and the recording data on the first column is transferred to the recording head by the timing (1T), which is 32 timing behind. Then, behind this timing by 1, the discharge (heat) is given at the timing (1H). At the timing (2T), the recording data on the second column is transferred to the recording head, and the discharge (heat) is given at the timing (2H). At the time (3T), the recording data on the third column is transferred to the recording head, and the discharge (heat) is given at the timing (3H). Likewise, the data are processed one after another corresponding to (4) to (16). Also, on the other bank, storage is made at the timing (17).

Then, the data on the transfer buffer are cleared at the discharge timing after all the data, which should be stored per scan, are transferred to the recording head. This timing is defined as (1C).

In this respect, the transfer of recording data and the data clear are executed at one timing, but when this timing takes place, the data transfer (=reading of recording data) from the transfer buffer to the recording head is processed at first. During such process, the write disable signal is output. When the data transfer is complete, the write disable signal is cleared. Therefore, the data clear is eventually effectuated only subsequent to the clear of the write disable signal.

Therefore, although the process of data storage (=the recording data writing) on the transfer buffer is initiated at the same time that the timing takes place, the actual storage on the transfer buffer should wait during the write disable signal is output. The structure is arranged so that when the clear of write disable signal is detected, data is stored on the transfer buffer.

Like this, it is structured to give priority to reading under any circumstances for the read/write process with respect to the transfer buffer.

With this process, the transfer buffer formed by two banks is cleared after the recording data per scan (the recording data of 32-column portion for this example) has been transferred. In this respect, the case where the recording data of 32-column portion is recorded by the recording head is described here, but a case where recording data of 2,880 column-portion is recorded by the recording head is equally processed, and the data on the transfer buffer is cleared during a period of 32 timing after the recording data has been transferred to the recording head.

Thus, the data on the transfer buffer is cleared after the data has been transferred to the recording head during the main scan thereof, and preparation is made for the storage of the data on the next main scan.

As described above, the data of 16 bits (=16 heat timing) can be processed at a time in the scanning direction of the recording head 1. By the utilization of this process, recording data are stored on the transfer buffer at the timing before 32 recording timing. Then, the recording data is transferred to the recording head 1 in a serial formation at the timing before the recording timing by 1 in accordance with the transfer timing. Then, printing is made at the next heat timing.

The area that corresponds to each nozzle of the recording head 1 is allocated to the transfer buffer, which is provided with two banks capable of storing data of 16-column portion. During the sequential transfer of recording data from the bank on one side to the recording head 1, data read out from the print buffer is stored (written) on the other bank. Therefore, during the recording of the data of 16-column portion by the recording head, data of the next 16-column portion is stored on the bank on one side. Then, the bank for which transfer and storage are completed performs the storage of the next data. In this way, data are transferred to the recording head alternately from the two banks.

Here, in accordance with the present embodiment, it is possible to store data of 16-column portion on the transfer buffer at 1 timing. Therefore, storage can be made once in 16 heat triggers. Also, the transfer buffer can be cleared at one timing for each 16-column portion. Thus, for example, it is good enough to execute clear once during the period of (1C) to (16C) and (17C) to (32C), respectively, thus completing the clear process for two banks.

Consequently, in order to heat each of the recording heads corresponding to ink of four colors (BK, C, M, and Y) in accordance with the present embodiment, the same timing signal is prepared for each of them.

Or, it may be possible to allocate one of 1-timing signals as signal of each color per timing. In FIG. 5, for example, the (1) and (3) are allocated to BK, the (5) and (7) to C, the (9) and (11) to M, and the (13) and (15) to Y.

FIRST EMBODIMENT

FIG. 6 is a flowchart that shows the process flow of recording data in accordance with a first embodiment. This process is executed for the recording data of the respective recording heads per recording of each scan.

In step S601, the null flag data, which corresponds to the position of the print buffer to be read, is examined (after the examination, the address of the null flag is updated). If no null flag is set, the recording data is DMA read from the print buffer in step S602 where the consecutive eight-word portion is read out. In step S603, the recording data thus read out is written on the specific writable block of HV converting means in accordance with the value of the HV counter. In step S604, the value of the address counter that indicates the reading-out print buffer is updated.

On the other hand, if the null flag is set in the step S601, no reading out from the print buffer is executed by DMA means, but zero data is written (zero clear is executed) in step S605 in accordance with the value of the HV counter. In this case, the clear signal is inputted into the writable block to be cleared.

In step S606, the read counter and the HV counter are incremented. Here, the read counter is used for reading the recording data of nozzle portion of the recording head, which is incremented per reading of eight words (=eight-nozzle portion). For example, the recording head that deals with cyan ink is provided with 128 nozzles. Therefore, counting is made up to 16. The HV counter is used for counting up to 3 in order to control HV converting means.

In step S607, it is determined whether or not the value of the HV counter is the specific one (which is equal to 3 for the present embodiment). If the value of the HV counter is not the specific value, it is determined that the timing is not for reading from HV means, and the process returns to the step S601 for the continuation thereof. If the value of the HV counter is the specific value, the HV conversion is executed in step S608, and in step S609, the result of the HV conversion is read out from HV converting means to store it on the transfer buffer provided for the SRAM 106.

In step S610, whether or not the value of the read counter is the specific value (which is equal to 16 for the present embodiment) is examined.

On the other hand, if the read counter is the specific value in the step S610, the read counter and the HV counter are cleared in step S611.

If no specific value is reached, the recording data of all the nozzle portions are not yet written on the transfer buffer. Therefore, in step S612, the process returns to the step S601 after the HV counter is cleared, and the process continues.

As described earlier, in accordance with the present embodiment, it is possible to store the data of 16-column portion by one-time buffer reading. Therefore, it is good enough to read the buffer once for 16 heat triggers. Thus, the data storing process on the transfer buffer may be executed in a unit of 16 columns for each recording head.

As has been described, for the print buffer having the null flag set, null data producing means performs writing on the transfer buffer, and omits the read-out process of recording data from the print buffer by DMA means. With this arrangement, it becomes possible to make use frequency of the DMA function smaller. Thus, the occupation rate of the DMA bus is reduced to make it possible to allocate the time that may be spared for other DMA process.

SECOND EMBODIMENT

A printer is provided with a draft mode and a high-quality mode as the operational mode of recording. The draft mode is such that part of recording data is thinned for printing at high speed. The high-quality mode is such that in order to reduce the unevenness that may exist between recording scans, recording is performed by plural numbers of scans, while making the recording data.

Thus, depending on the recording mode, mask data are read (read out) from the mask buffer with respect to the recording data read (read out) from the print buffer. Then, latch means performs latch to produce the recording data by taking AND thereof, and stores the data thus produced on HV converting means. At this juncture, the DMA means, which is dedicated for use of the mask buffer, is used to read out the mask data from the mask buffer.

In this case, if the data read out from the print buffer is null, the mask buffer is not read for reading out data (no data reading is executed) for the print buffer for which null flat is set (because the recording data becomes null irrespective of the data on the mask buffer).

FIG. 7 is a flowchart that shows the process flow of recording data in accordance with a second embodiment. This process is executed for the recording data of the respective recording heads per recording of each scan. In step S701, if no null flag is set, the print data is DMA read from the print buffer in step S702. In step S703, the value of the address counter, which indicates the address from which the print buffer is read out, is updated. In step S704, the mask data is DMA read from the mask buffer. In step S705, the recording data is completed by taking AND (logical multiply) of the print data and mask data thus read out.

On the other hand, in the step S701, the null flag data is examined (after the examination, the address of the null flag is updated). If no null flag is set, zero data (null data) is set in step S707, and the process proceeds to step S708.

In step S708, the address of the mask buffer is updated. On the mask buffer, the data corresponding to nozzles are stored invariably, because recording is completed by plural numbers of scanning. Therefore, unlike the print buffer, there is no occasion for the mask buffer to be used by arranging data compactly on the buffer with null flags.

Thus, the address of the mask buffer must be updated all the time even in a case where the mask buffer is not DMA read in accordance with the null skip control. The address of the mask buffer can be updated by means of the 16-increment in the same manner in which the address of the print buffer is updated as described earlier.

In step S709, the read counter and HV counter are incremented. In step S710, it is determined whether or not the value of the HV counter is the specific value (for the present embodiment, the specific value is equal to 3). If the value of the HV counter is not the specific one, it is determined that timing is not for reading from HV converting means. Then, the process returns to the step S701 for the continuation thereof. If the value of the HV counter is the specific one, the HV conversion is executed in step S711, and in step S712, the result of the HV conversion is read out from HV converting means to store it on the transfer buffer provided for the SRAM 106.

In step S713, whether or not the value of the read counter is the specific one (which is equal to 32 for the present embodiment) is examined. If the read counter is the specific value in the step S713, the read counter and the HV counter are cleared in step S714.

If no specific value is reached, the recording data of all the nozzle portions are not yet written on the transfer buffer. Therefore, in step S715, the process returns to the step S701 after the HV counter is cleared, and the process continues.

As has been described, for the draft mode, the high-quality mode, or the like, the masking process of the recording data is given the DMA reading on the basis of the null flags in addition to the DMA reading process of the print buffer. If no null flag is set, the mask data is read out. If the null flag is set, no reading is made by DMA means. With the control thus performed, it becomes possible to make the use frequency of the DMA function smaller, and reduce the occupation rate of the DMA bus, hence reducing the controlling load of an ink jet recording apparatus as a whole.

THIRD EMBODIMENT

FIG. 8 is a flowchart that shows the process flow of recording data in accordance with the present embodiment. This process is executed for the recording data of the respective recording heads per recording of each scan.

In step S601, whether or not all the null flags are set (set at "1" or not) is examined for the print buffer corresponding to the nozzles (here 128 nozzles) of the recording head used for recording by one-time scan. When all the null flags are set, there is no image data to be recorded by the current scanning. Therefore, the process terminates (no DMA reading is executed by the scanning this time).

In this respect, null data is transferred to the recording head having null flags set for all the recording data thereof as a matter of course. Such recording head executes no recording.

On the other hand, if there is any print buffer having no null flag set therefor, the process proceeds to step S602. In the step S602, the recording data is DMA read from the print buffer (to obtain the recording data of consecutive eight-word portion in this embodiment).

In step S603, whether or not null flag is set is examined, (after examination, the address of the null flag is updated). If null data is set, the process proceeds to step S605 where the reading data is null cleared (zero cleared). On the other hand, if no null flag is set, the process proceeds to step S604 where the address of the print buffer is updated.

In step S606, the recording data thus read out is set at a specific position of the HV conversion block in accordance with the value of the HV counter. In step S607, addition is made in the read counter and HV counter.

Here, the read counter is the one that counts the recording data of entire nozzle portion of a recording head. For example, in accordance with the present embodiment, whenever eight words (=eight-nozzle portion) are read, the counter is incremented to count up to 16 (128 nozzle divided by 8 nozzles=16). Also, as described earlier, the HV counter is the one used for controlling the HV converting block, which counts "0" to "3".

In step S608, whether or not the HV counter indicates the specific number (="3") is determined. If affirmative, the HV conversion is made in step S609. If negative, the process returns to the step S602, and the control is executed for the steps to follow.

Here, if the null flag data that corresponds to the previous recording data is set, the control is executed without updating the address at which the print buffer reading is initiated.

In step S610, the data is read from the HV converting block and stored on the transfer buffer provided for the SRAM 106. In step S611, whether or not the read counter has reached the specific number (="16") is examined. If affirmative, the process terminates, because the data of entire nozzle portion has been written.

If the recording data of entire nozzle portion has not been stored on the transfer buffer, the process returns to the step S602 after clearing the HV counter in step S612.

As has been described, when the recording head performs scanning, the examination is made on the recording data of each recording head as to the setting of the null flags so as to ascertain whether or not the data of all nozzles are null (whether or not all the print buffers, which store the recording data for recording by means of scanning, are null). Then, if the null flags are all set for the corresponding print buffers to be used for recording by means of scanning, the control is made so as not to effectuate the DMA reading of the recording data on such printer buffer. In this way, it is made possible to make the frequency of unwanted DMA transfer smaller, thus reducing the occupation rate of the DMA bus.

FIG. 9 is a view that shows the example in which the structure of clearing the data that has been read as executable in the step S605, is implemented by hardware. This clear process is performed with the input of the clear signal shown in FIG. 4A.

In FIG. 9, reference marks G000 to G031 designate inverted gates, and G500 to G531, AND gate groups. Converted data are produced by taking AND of the eight nozzle unit null flag data serving as each individual controlling signal, and each of the read-out data. Then, the structure is arranged to invert the "1" that indicates the presence of recording data is to "0" only when the null flag data is set.

When the aforesaid control is executed, data are being read only at the timing (5) and (7) allocated to C, the timing (9) and (11) allocated to M, and the timing (13) and (15) allocated to Y per 16 heat triggers if all the BK data are null, for example. As to the BK data, all the transfer buffer corresponding to each nozzle of the recording head one to one individually is null cleared at the last stage of the previous scan. Also, in the aforesaid control, no access is made to the BK area of the transfer buffer. Therefore, null data are stored on the recording head 1.

So far, the description has been made of the first second and third embodiments, but the bit number and word number of the data used for the DMA transfer, the HV process, and others are not necessarily limited to the values described in the embodiments.

Also, the nozzle number and resolution of the recording head is not necessarily limited to the values described in the embodiments. It is also possible to use piezoelectric element for the driving portion of the recording element.

As described above, it is possible to make the frequency of unwanted DMA transfer smaller to suppress the occupation rate of the DMA bus by use of the DMA means that suspends the reading process from the print buffer in accordance with the null flags, but the clear circuit writes zero data into data converting means instead. In this way, the efficiency of DMA transfer performance is enhanced with respect to the recording operation of an ink jet recording apparatus.

Also, when the recording head scans, any unwanted DMA process is suspended if data is not present on the print buffer, thus making it possible to suppress the occupation rate of the DMA bus, hence enhancing the efficiency of the DMA transfer performance of the recording operation of an ink jet recording apparatus.

What is claimed is:

1. An ink jet recording apparatus provided with plural print buffers for storing recording data, and a null flag table capable of setting null flags corresponding to said print buffers, respectively, instead of storing null data on said print buffers, comprising:

data converting means for converting specific data, being provided with plural writable blocks for writing the recording data, and with a counter for retaining a value to designate a writable block;

clear means for zero clearing a writable block in accordance with the value of said counter;

DMA means for reading out the recording data from said print buffers for writing the recording data on said writable blocks;

null flag examination means for examining the null flags corresponding to each of the print buffers; and control means for enabling said clear means to zero clear a writable block when a null flag is set on said null flag table corresponding to a print buffer, instead of performing a process by said DMA means to read out data from said print buffer.

2. An ink jet recording apparatus according to claim 1, further comprising:

a mask buffer for storing mask data for masking the recording data;

an address counter of said mask buffer for designating said mask buffer; and second DMA means for reading out the mask data from said mask buffer in accordance with a value of said address counter, wherein said second DMA means does not read out said mask data when a null flag is not set on said null flag table corresponding to a print buffer.

3. An ink jet recording apparatus according to claim 2, wherein said address counter of said mask buffer updates the value of said address counter irrespective of the status of said null flag table.

4. An ink jet recording apparatus according to claim 1, further comprising:

a transfer buffer for storing the recording data converted by said data converting means for the transfer thereof to a recording head.

5. An ink jet recording apparatus according to claim 4, wherein the recording data stored on said transfer buffer are transferred to said recording head in accordance with a specific timing signal.

6. An ink jet recording apparatus according to claim 4, wherein heat is given corresponding to the recording data at a specific timing after the recording data are transferred to said recording head.

7. An ink jet recording apparatus according to claim 5, wherein data on said transfer buffer are cleared at a specific timing after completion of the transfer of the recording data to said recording head.

8. An ink jet recording apparatus according to claim 1, further comprising a recording head provided with plural recording elements including an electrothermal converting element for generating thermal energy as energy for discharging ink.

9. A method for controlling an ink jet recording apparatus provided with plural print buffers for storing recording data, a null flag table capable of setting null flags corresponding to said print buffers, respectively, and data converting means for performing specific conversion of the recording data written on a writable block comprising the steps of:

reading out recording data from a print buffer by DMA means;

zero clearing the writable block by clear means; and executing said clearing step instead of executing said reading out step when a null flag is set on the null flag table corresponding to the print buffer.

10. An ink jet recording apparatus provided with plural print buffers for retaining recording data for recording by enabling a recording head to scan on a recording medium, and null flag table capable of setting null flags corresponding to a specific number of data instead of storing null data on said print buffers, comprising:

DMA means for reading out the recording data from the specific number of print buffers per scan;

null flag examination means for examining the null flags corresponding to each one of the specific number of print buffers; and control means for enabling said null flag examination means to examine the null flags per scan for the suspension of reading out by said DMA means when a result of the examination indicates that all the null flags in a given scan are set.

11. An ink jet recording apparatus according to claim 10, further comprising:

data converting means provided with plural writable blocks for writing recording data read out by said DMA means, and a counter for retaining values to designate said writable blocks.

12. An ink jet recording apparatus according to claim 11, further comprising:

a transfer buffer for storing data converted by said data converting means for transfer thereof to the recording head.

13. An ink jet recording apparatus according to claim 11, further comprising:

a clear circuit for clearing said writable blocks.

14. An ink jet recording apparatus according to claim 12, wherein the recording data stored on said transfer buffer are transferred to the recording head at a specific timing signal.

15. An ink jet recording apparatus according to claim 14, wherein, when discharges are made from the recording head in accordance with the specific timing signal, the data on said transfer buffer are cleared in accordance with the specific timing signal.

16. An ink jet recording apparatus according to claim 10, wherein the recording head is provided with plural recording elements including an electrothermal converting element for generating thermal energy as energy for discharging ink.

17. A method for controlling an ink jet recording apparatus provided with plural print buffers for retaining recording data for recording by enabling a recording head to scan on a recording medium, and a null flag table capable of setting null flags corresponding to a specific number of data instead of storing null data on said print buffers, comprising the steps of:

reading out the recording data from the specific number of print buffers per scan by DMA means;

examining null flags on the null flag table corresponding to each of the specific number of print buffers; and suspending said reading out when all the null flags are set.

* * * * *